(12) United States Patent
Youssef et al.

(10) Patent No.: US 12,487,642 B2
(45) Date of Patent: Dec. 2, 2025

(54) METHOD AND SYSTEM FOR DETERMINING HINGE ANGLE

(71) Applicant: INVENSENSE, INC., San Jose, CA (US)

(72) Inventors: Joe Youssef, Noyarey (FR); Bruno Flament, Saint Joseph de Riviere (FR)

(*) Notice: Subject to any disclaimer, the term of this patent is extended or adjusted under 35 U.S.C. 154(b) by 484 days.

(21) Appl. No.: 17/867,969

(22) Filed: Jul. 19, 2022

(65) Prior Publication Data

US 2023/0027806 A1  Jan. 26, 2023

Related U.S. Application Data (60) Provisional application No. 63/223,483, filed on Jul. 19, 2021.

(51) Int. Cl.
G06F 1/16 (2006.01)
G01B 7/305 (2006.01)

(52) U.S. Cl.
CPC ........... G06F 1/1677 (2013.01); G01B 7/305 (2013.01)

(58) Field of Classification Search
CPC .... G06F 1/1616; G06F 1/1694; G06F 1/1677; G06F 1/1641; G06F 1/1652; G06F 1/3206; G06F 1/3231; G06F 1/3246; G06F 1/3287; G06F 1/1643; G06F 1/1649; G06F 1/1686; G06F 1/3215; G06F 1/3265; G06F 2203/04101; G06F 2203/04806; G06F 3/017; G06F 3/0416; G06F 3/04845; G06F 3/04883; G01B 7/30; G01B 7/31; G01D 18/00; G01D 5/16; G01D 5/142; G01D 1/16; G01D 5/12; G01D 5/145; G01C 1/00; G01C 21/188; G01C 21/20; G01C 25/00; G01C 19/5705; G01C 9/08; G01P 3/44; G01P 15/14; G01P 15/18; G01P 15/04; H04M 1/0245

See application file for complete search history.

(56) References Cited

U.S. PATENT DOCUMENTS

| | | | |
|---|---|---|---|
| 10,191,511 B2 * | 1/2019 | Kang | G06F 1/1624 |
| 10,976,150 B2 * | 4/2021 | Zancanato | G01P 15/14 |
| 11,599,178 B2 * | 3/2023 | Rivolta | G06F 1/1677 |
| 11,656,071 B2 * | 5/2023 | Rizzardini | G01D 5/142 |
| | | | 700/275 |
| 11,680,823 B2 * | 6/2023 | Li | G05D 1/0212 |
| | | | 701/117 |

(Continued)

FOREIGN PATENT DOCUMENTS

| | | | | |
|---|---|---|---|---|
| CN | 104094084 B | * | 9/2017 | ............ G01P 15/125 |
| CN | 114787746 A | * | 7/2022 | ........... G06F 1/1677 |

(Continued)

Primary Examiner — Matthew C Sams (57) ABSTRACT

Described herein are methods and systems for determining a relative position of different portions of a hinged device. Motion sensor data from sensor assemblies of each portion is fused to relate the device portions to a world frame. An angular orientation between the device portions is determined with respect to the hinge axis and accumulating sensor measurement errors are compensated by constraining determined axes of the sensor assemblies using the motion sensor data and known relationships between physical axes of the sensor assemblies and the mechanical hinge, such that the determined axes of the sensor assemblies are aligned along the hinge axis.

14 Claims, 4 Drawing Sheets

(56) References Cited

U.S. PATENT DOCUMENTS

| | | | |
|---|---|---|---|
| 11,809,237 B2* | 11/2023 | Cui | G06F 1/1618 |
| 12,007,237 B2* | 6/2024 | Rizzardini | G05B 17/02 |
| 2015/0130725 A1* | 5/2015 | Knepper | G06F 3/017 |
| | | | 345/173 |
| 2018/0061374 A1* | 3/2018 | Wygonik | G09G 5/26 |
| 2018/0340768 A1* | 11/2018 | Zancanato | G06F 1/1677 |
| 2021/0033421 A1* | 2/2021 | Li | G01C 21/188 |
| 2021/0348911 A1* | 11/2021 | Rizzardini | G05B 17/02 |
| 2022/0350373 A1* | 11/2022 | Cui | G06F 1/1677 |
| 2023/0251078 A1* | 8/2023 | Rizzardini | G01D 5/16 |
| | | | 700/275 |
| 2023/0384343 A1* | 11/2023 | Rizzardini | G06F 1/1652 |
| 2023/0384837 A1* | 11/2023 | Rizzardini | H04M 1/0245 |
| 2024/0085960 A1* | 3/2024 | Rizzardini | G06F 1/1652 |
| 2024/0302867 A1* | 9/2024 | Wang | G06F 1/1694 |

FOREIGN PATENT DOCUMENTS

| | | | | |
|---|---|---|---|---|
| KR | 20220117198 A | * | 8/2022 | G06F 1/1677 |
| WO | WO-2018039005 A1 | * | 3/2018 | G06F 1/1616 |
| WO | WO-2021128245 A1 | * | 7/2021 | G01B 7/30 |
| WO | WO-2023087832 A1 | * | 5/2023 | G06F 3/017 |

* cited by examiner

METHOD AND SYSTEM FOR DETERMINING HINGE ANGLE

CROSS-REFERENCE TO RELATED APPLICATIONS

This application claims priority to U.S. Provisional Patent Application Ser. No. 63/223,483, filed Jul. 19, 2021, which is incorporated in full by reference.

FIELD OF THE PRESENT DISCLOSURE

This disclosure generally relates to motion sensors and more specifically to the use of such sensors to determine relative positioning of different movable device portions.

BACKGROUND

The development of microelectromechanical systems (MEMS) has enabled the incorporation of a wide variety of sensors into portable devices, such as cell phones, laptops, tablets, gaming devices and other portable, electronic devices. Often, such sensors are employed to gather information about movement conditions or the environment affecting the device as a whole. However, motion sensors may also be used to determine operational characteristics of the device itself. For example, a number of different types of devices feature two or more portions that are movable with respect to each other, such as by being coupled by a mechanical hinge. One well-known illustration is a laptop computer that has a first portion with a screen connected to a second portion that carries the keyboard. Although a simple determination of whether the screen is "closed" or "open" relative to the keyboard is useful for power management purposes, more sophisticated determinations of device status can also be made. Again for the sake of illustration and not limitation, a hinge angle greater than a suitable threshold but less than approximately 180° may indicate a normal mode of operation while a hinge angle greater than 180° may indicate operation in display or "tent" mode. Similarly, the hinge angle of a flip phone or a phone with a folding screen may be used as an indication of how the device is being used so that appropriate adaptations in operation can be made. Accordingly, it will be appreciated that determination of hinge angle has a number of useful applications and indeed modern software operating systems are configured to employ this information. It should also be appreciated that determination of hinge angle has use in other contexts, such as for controlling articulating robotic arms.

One strategy for determining hinge angle is to use a motion sensor assembly, such as an Inertial Measurement Unit (IMU), in the respective portions of the device. Typically, inertial motion sensors include gyroscopes that measure angular velocity and accelerometers that measure specific forces along one or more orthogonal axes. Conventional determinations of hinge angle using accelerometer-based information alone may suffer from certain drawbacks in that accelerometer data tends to be noisy which consequently results in a relatively noisy estimate of hinge angle. Further, accelerometer-based determinations may be susceptible to small, shaking motion affecting the device or the sensors may saturate when experiencing large accelerations, either of which interferes with the accuracy of hinge angle estimates. Yet another problem associated with the use of accelerometers to determine hinge angle is the well-known limitation to sense rotation about an axis aligned with the gravity vector, namely heading or yaw. Accordingly, when the hinge is aligned with gravity, accelerometers cannot provide relevant information about the relative rotational position of the device portions connected by that hinge.

Therefore, there is a need for a systems and methods for determining hinge angle that overcomes the deficiencies discussed above. The techniques of this disclosure as described in the following materials satisfies this and other needs.

SUMMARY

As will be described in detail below, a first portion of a device may be coupled to a second portion of the device by a mechanical hinge with one degree of rotational freedom along a hinge axis. As such, a relative position of the different device portions may be determined. Suitable methods include obtaining motion sensor data from a sensor assembly integrated with the first portion of the device, wherein the sensor assembly comprises a three-axis accelerometer and a three-axis gyroscope and obtaining motion sensor data from a sensor assembly integrated with the second portion of the device, wherein the sensor assembly comprises a three-axis accelerometer and a three-axis gyroscope. Six-axis sensor fusion may be performed for each sensor assembly with the obtained motion sensor data to relate the first portion of the device and the second portion of the device to a world frame. An angular orientation may be determined between the first portion of the device and the second portion of the device with respect to the hinge axis. Accumulating sensor measurement errors may be compensated by constraining a determined axis of the sensor assembly of the first portion with a determined axis of the sensor assembly of the second portion based at least in part on the obtained motion sensor data and known relationships between physical axes of the sensor assemblies and the mechanical hinge. The determined axis of the sensor assembly of the first portion and the determined axis of the sensor assembly of the second portion may be aligned along the hinge axis.

This disclosure also relates to a system for determining a relative position of different device portions. The system may include a device with a first portion and a second portion coupled by a mechanical hinge with one degree of rotational freedom along a hinge axis. Each portion includes an integrated sensor assembly configured to output motion sensor data, wherein each sensor assembly comprises a three-axis accelerometer and a three-axis gyroscope. The system also has at least one processor configured to perform six-axis sensor fusion for each sensor assembly with the motion sensor data to relate the first portion of the device and the second portion of the device to a world frame. The at least one processor may also determine an angular orientation between the first portion of the device and the second portion of the device with respect to the hinge axis. Accumulating sensor measurement errors are compensated by constraining a determined axis of the sensor assembly of the first portion with a determined axis of the sensor assembly of the second portion based at least in part on the obtained motion sensor data and known relationships between physical axes of the sensor assemblies and the mechanical hinge. The determined axis of the sensor assembly of the first portion and the determined axis of the sensor assembly of the second portion may be aligned along the hinge axis.

DETAILED DESCRIPTION

At the outset, it is to be understood that this disclosure is not limited to particularly exemplified materials, architectures, routines, methods or structures as such may vary. Thus, although a number of such options, similar or equivalent to those described herein, can be used in the practice or embodiments of this disclosure, the preferred materials and methods are described herein.

It is also to be understood that the terminology used herein is for the purpose of describing particular embodiments of this disclosure only and is not intended to be limiting.

The detailed description set forth below in connection with the appended drawings is intended as a description of exemplary embodiments of the present disclosure and is not intended to represent the only exemplary embodiments in which the present disclosure can be practiced. The term "exemplary" used throughout this description means "serving as an example, instance, or illustration," and should not necessarily be construed as preferred or advantageous over other exemplary embodiments. The detailed description includes specific details for the purpose of providing a thorough understanding of the exemplary embodiments of the specification. It will be apparent to those skilled in the art that the exemplary embodiments of the specification may be practiced without these specific details. In some instances, well known structures and devices are shown in block diagram form in order to avoid obscuring the novelty of the exemplary embodiments presented herein.

For purposes of convenience and clarity only, directional terms, such as top, bottom, left, right, up, down, over, above, below, beneath, rear, back, and front, may be used with respect to the accompanying drawings or chip embodiments. These and similar directional terms should not be construed to limit the scope of the disclosure in any manner.

In this specification and in the claims, it will be understood that when an element is referred to as being "connected to" or "coupled to" another element, it can be directly connected or coupled to the other element or intervening elements may be present. In contrast, when an element is referred to as being "directly connected to" or "directly coupled to" another element, there are no intervening elements present.

Some portions of the detailed descriptions which follow are presented in terms of procedures, logic blocks, processing and other symbolic representations of operations on data bits within a computer memory. These descriptions and representations are the means used by those skilled in the data processing arts to most effectively convey the substance of their work to others skilled in the art. In the present application, a procedure, logic block, process, or the like, is conceived to be a self-consistent sequence of steps or instructions leading to a desired result. The steps are those requiring physical manipulations of physical quantities. Usually, although not necessarily, these quantities take the form of electrical or magnetic signals capable of being stored, transferred, combined, compared, and otherwise manipulated in a computer system.

It should be borne in mind, however, that all of these and similar terms are to be associated with the appropriate physical quantities and are merely convenient labels applied to these quantities. Unless specifically stated otherwise as apparent from the following discussions, it is appreciated that throughout the present application, discussions utilizing the terms such as "accessing," "receiving," "sending," "using," "selecting," "determining," "normalizing," "multiplying," "averaging," "monitoring," "comparing," "applying," "updating," "measuring," "deriving" or the like, refer to the actions and processes of a computer system, or similar electronic computing device, that manipulates and transforms data represented as physical (electronic) quantities within the computer system's registers and memories into other data similarly represented as physical quantities within the computer system memories or registers or other such information storage, transmission or display devices.

Embodiments described herein may be discussed in the general context of processor-executable instructions residing on some form of non-transitory processor-readable medium, such as program modules, executed by one or more computers or other devices. Generally, program modules include routines, programs, objects, components, data structures, etc., that perform particular tasks or implement particular abstract data types. The functionality of the program modules may be combined or distributed as desired in various embodiments.

In the figures, a single block may be described as performing a function or functions; however, in actual practice, the function or functions performed by that block may be performed in a single component or across multiple components, and/or may be performed using hardware, using software, or using a combination of hardware and software. To clearly illustrate this interchangeability of hardware and software, various illustrative components, blocks, modules, circuits, and steps have been described above generally in terms of their functionality. Whether such functionality is implemented as hardware or software depends upon the particular application and design constraints imposed on the overall system. Skilled artisans may implement the described functionality in varying ways for each particular application, but such implementation decisions should not be interpreted as causing a departure from the scope of the present disclosure. Also, the exemplary wireless communications devices may include components other than those shown, including well-known components such as a processor, memory and the like.

The techniques described herein may be implemented in hardware, software, firmware, or any combination thereof, unless specifically described as being implemented in a specific manner. Any features described as modules or components may also be implemented together in an integrated logic device or separately as discrete but interoperable logic devices. If implemented in software, the techniques may be realized at least in part by a non-transitory processor-readable storage medium comprising instructions that, when executed, performs one or more of the methods described above. The non-transitory processor-readable data storage medium may form part of a computer program product, which may include packaging materials.

The non-transitory processor-readable storage medium may comprise random access memory (RAM) such as synchronous dynamic random access memory (SDRAM), read only memory (ROM), non-volatile random access memory (NVRAM), electrically erasable programmable read-only memory (EEPROM), FLASH memory, other known storage media, and the like. The techniques additionally, or alternatively, may be realized at least in part by a processor-readable communication medium that carries or communicates code in the form of instructions or data structures and that can be accessed, read, and/or executed by a computer or other processor. For example, a carrier wave may be employed to carry computer-readable electronic data such as those used in transmitting and receiving electronic mail or in accessing a network such as the Internet or a local area network (LAN). Of course, many modifications may be made to this configuration without departing from the scope or spirit of the claimed subject matter.

The various illustrative logical blocks, modules, circuits and instructions described in connection with the embodiments disclosed herein may be executed by one or more processors, such as one or more motion processing units (MPUs), digital signal processors (DSPs), general purpose microprocessors, application specific integrated circuits (ASICs), application specific instruction set processors (ASIPs), field programmable gate arrays (FPGAs), or other equivalent integrated or discrete logic circuitry. The term "processor," as used herein may refer to any of the foregoing structure or any other structure suitable for implementation of the techniques described herein. In addition, in some aspects, the functionality described herein may be provided within dedicated software modules or hardware modules configured as described herein. Also, the techniques could be fully implemented in one or more circuits or logic elements. A general purpose processor may be a microprocessor, but in the alternative, the processor may be any conventional processor, controller, microcontroller, or state machine. A processor may also be implemented as a combination of computing devices, e.g., a combination of an MPU and a microprocessor, a plurality of microprocessors, one or more microprocessors in conjunction with an MPU core, or any other such configuration.

Unless defined otherwise, all technical and scientific terms used herein have the same meaning as commonly understood by one having ordinary skill in the art to which the disclosure pertains.

Finally, as used in this specification and the appended claims, the singular forms "a, "an" and "the" include plural referents unless the content clearly dictates otherwise.

As noted above, the techniques of this disclosure relate to the use of motion sensors to determine the relative position of different device portions that are coupled by a mechanical hinge. Correspondingly, the respective portions of the device can be moved in space and their motion and/or orientation in space therefore sensed. Details regarding one embodiment of device 100 including features of this disclosure are depicted as high-level schematic blocks in FIG. 1. Common examples include a portable device have at least two portions that are moveable with respect to each other, such as a laptop or notebook computer, mobile phone (e.g., cellular phone, a phone running on a local network, or any other telephone handset), wired telephone (e.g., a phone attached by a wire), personal digital assistant (PDA), video game player, video game controller, mobile internet device (MID), personal navigation device (PND), digital camera or the like. However, the techniques of this disclosure are not limited to portable devices and the described techniques can be applied to any device have movable portions that are coupled by a hinge, such as a robotic arm.

Figure 1:
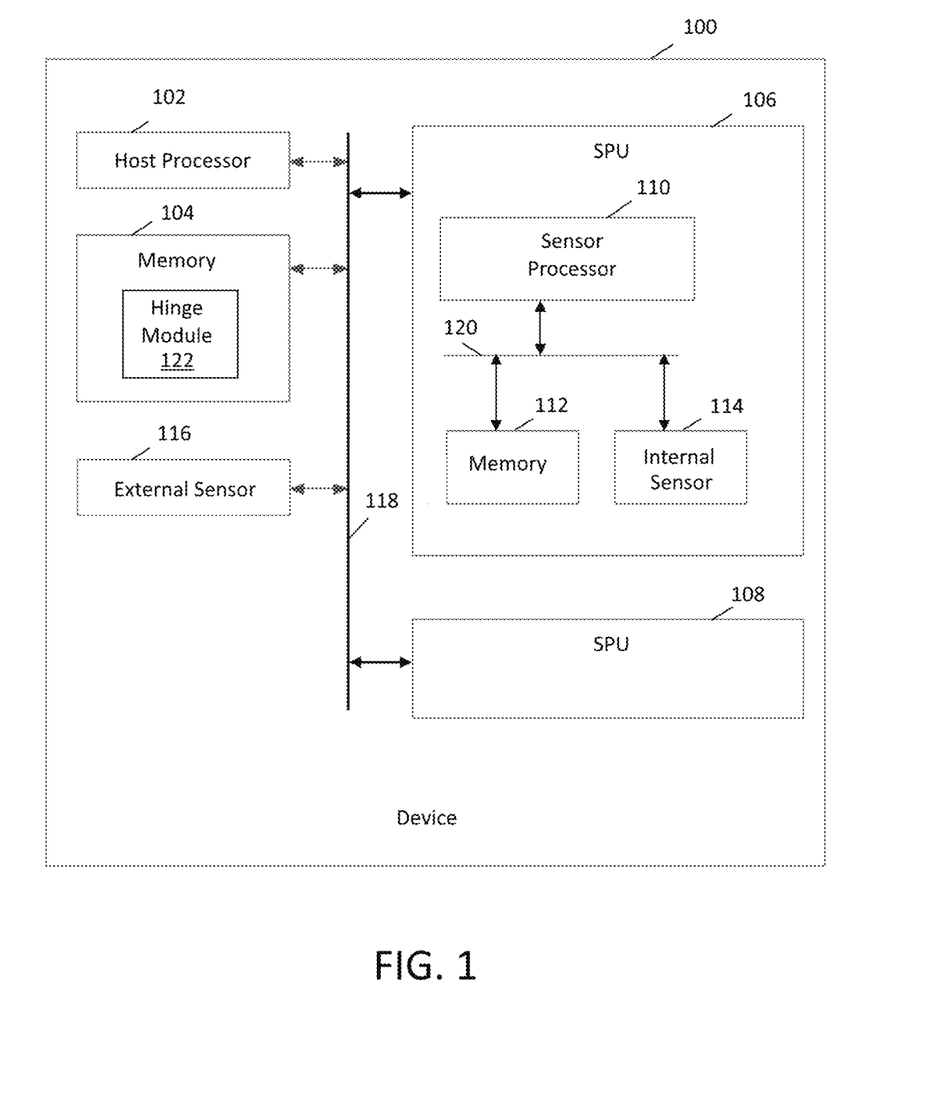
FIG. 1 is a schematic diagram of device having a sensor configuration that includes an opposing sensor pair to compensate for temperature gradient errors according to an embodiment.

As shown, device 100 includes a host processor 102, which may be one or more microprocessors, central processing units (CPUs), or other processors to run software programs, which may be stored in memory 104, associated with the functions of device 100. Multiple layers of software can be provided in memory 104, which may be any combination of computer readable medium such as electronic memory or other storage medium such as hard disk, optical disk, etc., for use with the host processor 102. For example, an operating system layer can be provided for device 100 to control and manage system resources in real time, enable functions of application software and other layers, and interface application programs with other software and functions of device 100. Similarly, different software application programs such as menu navigation software, games, camera function control, navigation software, communications software, such as telephony or wireless local area network (WLAN) software, or any of a wide variety of other software and functional interfaces can be provided. In some embodiments, multiple different applications can be provided on a single device 100, and in some of those embodiments, multiple applications can run simultaneously.

Device 100 includes at least two sensor assemblies, with at least one sensor assembly associated with each portion of the device that are moveable with respect to each other. In this embodiment, each sensor assembly is implemented in the form of integrated sensor processing units (SPUs) 106 and 108, which may also be termed inertial measurement units (IMUs). Exemplary details are shown for SPU 106 and SPU 108 may have the same or similar components. As depicted, SPU 106 features sensor processor 110, memory 112 and internal sensor 114. Memory 112 may store algorithms, routines or other instructions for processing data output by internal sensor 114 and/or other sensors as described below using logic or controllers of sensor processor 110, as well as storing raw data and/or motion data output by internal sensor 114 or other sensors. Memory 112 may also be used for any of the functions associated with memory 104. Internal sensor 114 may be one or more sensors for measuring motion of device 100 in space, such as an accelerometer, a gyroscope, a magnetometer, a pressure sensor or others. In one embodiment, internal sensor 114 may include rotational motion sensors and linear motion sensors. For example, the rotational motion sensors may be gyroscopes to measure angular velocity along three orthogonal axes and the linear motion sensors may be accelerometers to measure linear acceleration along three orthogonal axes. A sensor fusion operation performed by sensor processor 108, or other processing resources of device 100, combines data from internal sensor 114 to provide a six-axis determination of motion or six degrees of freedom (6DOF). In addition to gyroscopes and accelerometers, internal sensor 114 may also have other sensor(s) configured to measure one or more aspects about the environment surrounding device 100, for example, a pressure sensor and/or a magnetometer may be used to refine motion determinations made using internal sensor 114. As desired, internal sensor 114 may be implemented using Micro Electro Mechanical System (MEMS) to be integrated with SPU 106 in a single package. Exemplary details regarding suitable configurations of host processor 102 and SPU 106 may be found in, commonly owned U.S. Pat. No. 8,250,921, issued Aug. 28, 2012, and U.S. Pat. No. 8,952,832, issued Feb. 10, 2015, which are hereby incorporated by reference in their entirety. Suitable implementations for SPUs 106*a* and 106*b* in device 100 are available from TDK InvenSense, Inc. of San Jose, Calif.

Alternatively, or in addition, device 100 may implement one or more sensors in the form of external sensor 116. External sensor 116 may represent one or more sensors as described above, such as an accelerometer and/or a gyroscope, or any other type of sensor. As used herein, "external" means a sensor that is not integrated with SPU 206 but is still associated with one of the device portions. Although described in the context of one or more sensors being MEMS based, the techniques of this disclosure may be applied to any sensor design or implementation. Depending on the embodiment, any combination sensors of internal sensor 114 and external sensor 116 may be used to gather accelerometer and gyroscope data corresponding to movement of the portions of device 100.

In the embodiment shown, host processor 102, memory 104, SPU 106, SPU 108 and other components of device 100 may be coupled through bus 118, while sensor processor 108, memory 110, internal sensor 114 may be coupled though bus 120, either of which may be any suitable bus or interface, such as a peripheral component interconnect express (PCIe) bus, a universal serial bus (USB), a universal asynchronous receiver/transmitter (UART) serial bus, a suitable advanced microcontroller bus architecture (AMBA) interface, an Inter-Integrated Circuit (I2C) bus, a serial digital input output (SDIO) bus, a serial peripheral interface (SPI) or other equivalent. Depending on the architecture, different bus configurations may be employed as desired. For example, additional buses may be used to couple the various components of device 100, such as by using a dedicated bus between host processor 102 and memory 104.

Code, algorithms, routines or other instructions for processing sensor data may be employed by hinge module 122, schematically represented in this figure as being stored in memory 104 for execution by host processor 102, to perform any of the operations associated with the techniques of this disclosure. As will be discussed in further detail below, hinge module 122 may be configured to estimate the relative position of the device portions incorporating SPU 106 and SPU 108 to estimate the angle of a mechanical hinge coupling the device portions. In this case, SPU 106 and 108 may transfer the sensor data acquired to host processor 102 and/or memory 104 over bus 118. However, it should be appreciated that the functionality of hinge module 122 can be implemented using processors of either or both SPU 106 and 108. Further, any of the operations of hinge module 122 may be distributed among any of the processing resources available to device 100.

Any combination of sensor components of device 100 may be formed on different chips or may be integrated and reside on the same chip, creating a unitary package. A chip may be defined to include at least one substrate typically formed from a semiconductor material. A single chip or package may be formed from multiple substrates, where the substrates are mechanically bonded to preserve the functionality. A multiple chip includes at least two substrates, wherein the two substrates are electrically connected, but do not require mechanical bonding. A package provides electrical connection between the bond pads on the chip to a metal lead that can be soldered to a PCB. A package typically comprises a substrate and a cover. Integrated Circuit (IC) substrate may refer to a silicon substrate with electrical circuits, typically CMOS circuits. One or more sensors may be incorporated into the package if desired using any suitable technique. In some embodiments, a sensor may be MEMS-based, such that a MEMS cap provides mechanical support for the MEMS structure. The MEMS structural layer is attached to the MEMS cap. The MEMS cap is also referred to as handle substrate or handle wafer. In some embodiments, the first substrate may be vertically stacked, attached and electrically connected to the second substrate in a single semiconductor chip, while in other embodiments, the first substrate may be disposed laterally and electrically connected to the second substrate in a single semiconductor package. In one embodiment, the first substrate is attached to the second substrate through wafer bonding, as described in commonly owned U.S. Pat. No. 7,104,129, which is incorporated herein by reference in its entirety, to simultaneously provide electrical connections and hermetically seal the MEMS devices. This fabrication technique advantageously enables technology that allows for the design and manufacture of high performance, multi-axis, inertial sensors in a very small and economical package. Integration at the wafer-level minimizes parasitic capacitances, allowing for improved signal-to-noise relative to a discrete solution. Such integration at the wafer-level also enables the incorporation of a rich feature set which minimizes the need for external amplification.

Figure 2A:
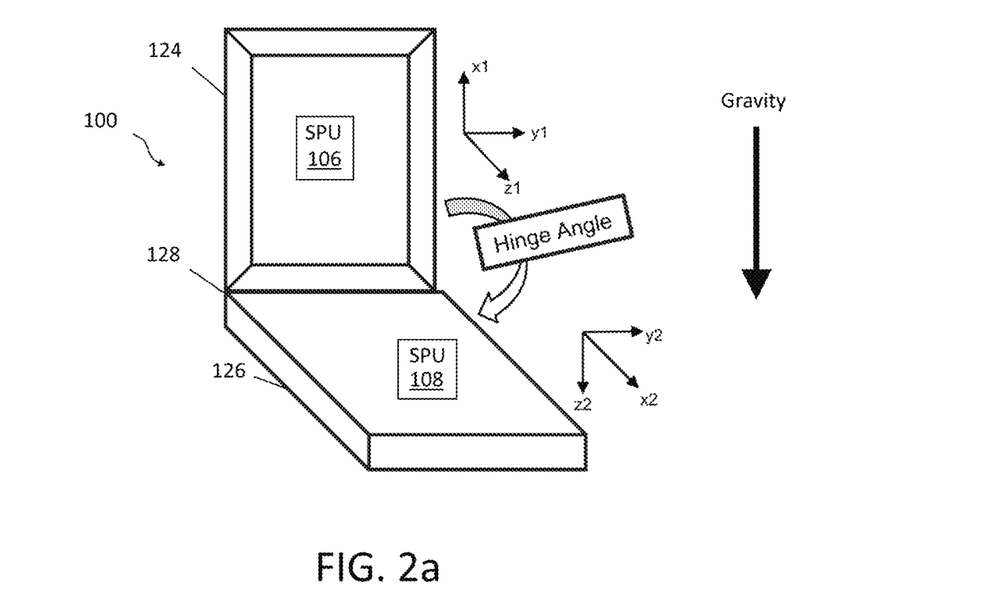
FIGS. 2a and 2b schematically depict different categories of orientation of a hinged device with respect to gravity according to an embodiment.
Figure 2B:
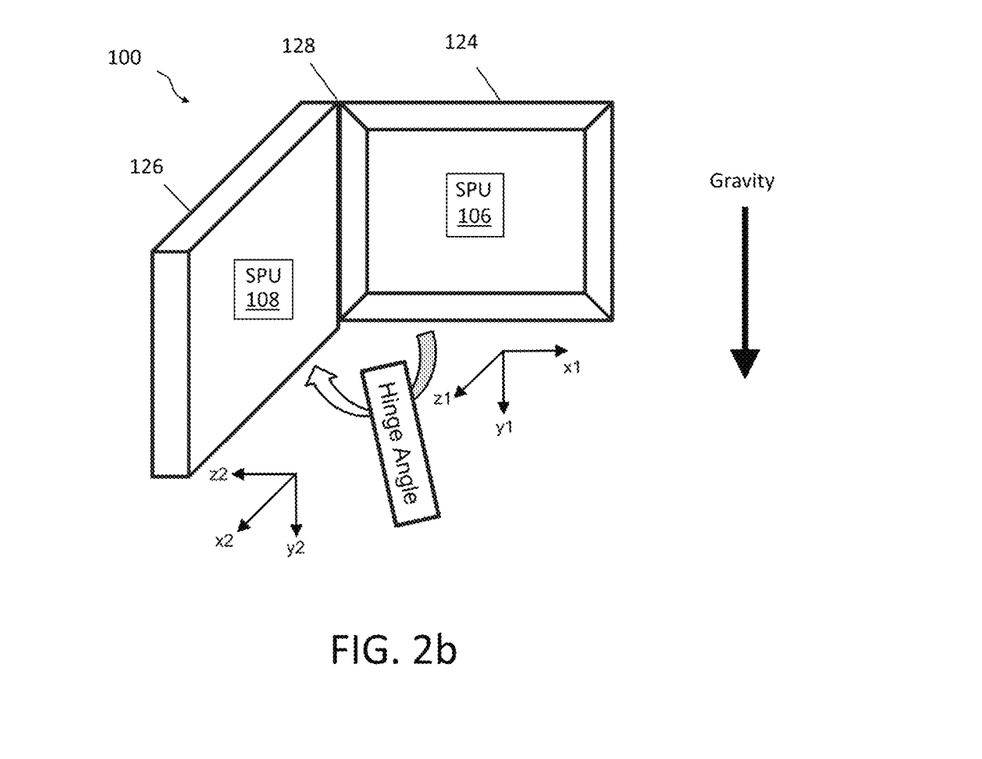

To provide context for the following discussion, FIGS. 2*a* and 2*b* depict two categories of orientation for device 100. As shown, device 100 with portion 124 is coupled to portion 126 by hinge 128, a mechanical coupling that allows one degree of rotational freedom along its axis. In the first category as depicted by FIG. 2*a*, hinge 128 is not in alignment with the gravity vector of the world frame. Notably, this includes typical operating conditions for a laptop, flip phone or other device having similar form factor when the hinge is approximately orthogonal to gravity and may be termed "normal mode" for these contexts. Under these conditions, determining the tilts of portion 124 and portion 126, namely the angle with respect to vertical as determined by the gravity vector, can be accomplished using a conventional sensor fusion operation on the accelerometer and gyroscope data obtained for SPU 106 and SPU 108. As noted above, accelerometer data tends to be relatively noisy, while gyroscope data typically experiences significant drift in bias over time. Employing sensor fusion allows these different sources of motion information to help compensate for each other's deficiencies. Specifically, sensor fusion for SPU 106 gives the orientation of portion 124 and sensor fusion for SPU 108 gives the orientation of portion 126. By taking the difference in these orientations, an accurate estimation may be made for the absolute hinge angle. For the purposes of this disclosure, absolute hinge angle refers to a hinge angle calculated using each portion's orientation with respect to the external reference of the gravity vector while relative hinge angle refers to the angular relationship between two device portions around the hinge axis without reference to gravity.

Conversely, a second category of potential orientations for device 100 includes conditions in which hinge 128 is vertical or close to vertical and is therefore substantially aligned with gravity as depicted by FIG. 2*b*. In the above contexts this may be termed "book mode." Importantly, determination of hinge angle in this category of orientation depends on the yaw of portion 124 and portion 126. As will be appreciated, accelerometers are known to lack the native capability sense yaw (also termed azimuth or heading) as this involves an angular rotation with respect to vertical, i.e., the gravity axis. Gyroscopes provide only relative motion information, namely the rate of angular rotation, so integration of the sensor readings may be used to determine a current orientation (including yaw) with respect to a previously known orientation but lack a fixed reference. Thus, when device 100 is in book mode, the hinge angle estimation must be determined as a change in angle relative to a hinge angle determination made previously in normal mode.

Importantly, because accelerometer data lacks yaw information regarding the rotation about the gravity axis, sensor fusion does not correct for the yaw drift of the gyroscope data and the accuracy of hinge angle estimation may degrade over time. The techniques of this disclosure overcome this deficiency to compensate for the accumulating sensor measurement errors by constraining a determined axis of the sensor assembly of the first portion with a determined axis of the sensor assembly of the second portion based at least in part on the obtained motion sensor data and known relationships between physical axes of the sensor assemblies and the mechanical hinge, wherein the determined axis of the sensor assembly of the first portion and the determined axis of the sensor assembly of the second portion are aligned. In the relatively simple case depicted in FIGS. 2*a* and 2*b*, the determined axes of SPU 106 and SPU 108 are the y-axis as shown, which is in alignment with the axis of hinge 128. However, the hinge axis need not correspond directly to the frame of reference of either SPU or their sensitive axes because the physical relationship of the sensitive axes to the hinge axis can readily be determined from the design of the device. For example, the sensors can have any orientation within each device portion so long as their orientation with respect to the hinge axis is known. Thus, the determined axis depends on how the sensors are positioned in each portion of the device with respect to the hinge axis.

According to the above discussion, hinge module 122 may therefore be used to determine hinge angle for portion 124 and portion 126 by applying sensor fusion to the accelerometer and gyroscope data from SPU 106 and SPU 108 respectively to obtain their orientations relative to the world frame and then determine a constraint rotation along the vertical axis so that the hinge axis in each sensor frame is aligned. This can be a rotation applied to the orientation of SPU 106, such as represented by a quaternion, to bring its hinge axis into alignment with the hinge axis in the sensor from of SPU 108 or vice versa. Alternatively, different rotations could be applied to both sensor frame so that their respective hinge axis align with a common vector, such as an average. These techniques exploit the mechanical coupling provided by hinge 128, which allows a single degree of freedom in the orientation of portion 124 with respect to portion 126 along this shared hinge axis, but otherwise maintains the other two orthogonal axes in a fixed relationship. During operation in normal mode, hinge module 122 is able make an accurate estimation of hinge angle as discussed above and by maintaining the constraint that the hinge axis relative to SPU 106 and the hinge axis relative to SPU 108 must be the same, information from the gyroscopes can be used to track the relative change in hinge angle even when device 100 is placed in book mode. Notably, even though the drift in gyroscope information is not corrected with accelerometer data, forcing the respective hinge axes to align negates the effect of drift on the hinge angle calculation so that hinge angle can be accurately determined in book mode relative to the absolute hinge angle estimated when in normal mode.

As detailed in this disclosure, relative position of different device portions for a first portion of a device coupled to a second portion of the device by a mechanical hinge with one degree of rotational freedom along a hinge axis may be determined. Suitable methods include obtaining motion sensor data from a sensor assembly integrated with the first portion of the device, wherein the sensor assembly comprises a three-axis accelerometer and a three-axis gyroscope, obtaining motion sensor data from a sensor assembly integrated with the second portion of the device, wherein the sensor assembly comprises a three-axis accelerometer and a three-axis gyroscope, performing six-axis sensor fusion for each sensor assembly with the obtained motion sensor data to relate the first portion of the device and the second portion of the device to a world frame, determining an angular orientation between the first portion of the device and the second portion of the device with respect to the hinge axis and compensating for accumulating sensor measurement errors by constraining a determined axis of the sensor assembly of the first portion with a determined axis of the sensor assembly of the second portion based at least in part on the obtained motion sensor data and known relationships between physical axes of the sensor assemblies and the mechanical hinge, wherein the determined axis of the sensor assembly of the first portion and the determined axis of the sensor assembly of the second portion are aligned along the hinge axis.

In one aspect, the determined angular orientation may be tracked over time when compensating for the accumulating sensor measurement errors. An absolute orientation for the first portion and an absolute orientation for the second portion may be determined during the tracking.

In one aspect, compensating for the accumulating sensor measurement errors may occur when the mechanical hinge is substantially aligned with a gravity vector. A determined rotation angle about the gravity vector may be applied to an orientation of at least one of the portions of the device.

In one aspect, compensating for the accumulating sensor measurement errors may include determining a relative orientation for the first portion and a relative orientation for the second portion such that the determined axis for the sensor assembly of the first portion is set to match the determined axis of the sensor assembly of the second portion.

In one aspect, a corrected orientation of at least one of the portions of the device may be employed to determine hinge angle based on motion of the device. A previous calibration of the sensor assembly of the first portion and the sensor assembly of the second portion may be performed when the mechanical hinge is not aligned with a gravity vector.

Similarly, this disclosure also relates to a system for determining a relative position of different device portions. The system may include a first portion of a device having an integrated sensor assembly configured to output motion sensor data, wherein the sensor assembly comprises a three-axis accelerometer and a three-axis gyroscope, a second portion of the device having an integrated sensor assembly configured to output motion sensor data, wherein the sensor assembly comprises a three-axis accelerometer and a three-axis gyroscope, a mechanical hinge with one degree of rotational freedom along a hinge axis coupling the first portion of the device and the second portion of the device and at least one processor configured to perform six-axis sensor fusion for each sensor assembly with the motion sensor data to relate the first portion of the device and the second portion of the device to a world frame, determine an angular orientation between the first portion of the device and the second portion of the device with respect to the hinge axis and compensate for accumulating sensor measurement errors by constraining a determined axis of the sensor assembly of the first portion with a determined axis of the sensor assembly of the second portion based at least in part on the obtained motion sensor data and known relationships between physical axes of the sensor assemblies and the mechanical hinge, wherein the determined axis of the sensor assembly of the first portion and the determined axis of the sensor assembly of the second portion are aligned along the hinge axis.

In one aspect, the at least one processor may be further configured to track the determined angular orientation over time when compensating for the accumulating sensor measurement errors.

In one aspect, the at least one processor may be further configured to determine an absolute orientation for the first portion and an absolute orientation for the second portion during the tracking.

In one aspect, the at least one processor may be further configured to compensate for the accumulating sensor measurement errors when the mechanical hinge is substantially aligned with a gravity vector.

In one aspect, the at least one processor may be further configured to compensate for the accumulating sensor measurement errors by applying a determined rotation angle about the gravity vector to an orientation of at least one of the portions of the device.

In one aspect, the at least one processor may be further configured to compensate for the accumulating sensor measurement errors by determining a relative orientation for the first portion and a relative orientation for the second portion such that the hinge axis for the sensor assembly of the first portion is set to match the hinge axis of the sensor assembly of the second portion.

In one aspect, the at least one processor may be further configured to employ a corrected orientation of at least one of the portions of the device to determine hinge angle based on motion of the device.

In one aspect, the at least one processor may be further configured to perform a previous calibration of the sensor assembly of the first portion and the sensor assembly of the second portion when the mechanical hinge is not aligned with a gravity vector.

EXAMPLES

As will be appreciated, the techniques of this disclosure may be implemented in a variety of manners that will depend in part on how orientation is represented. The following illustrative example is provided using quaternions, but one of ordinary skill in the art will recognize that adaptation may be employed when using Euler angles or rotation matrices to represent orientation.

Figure 3:
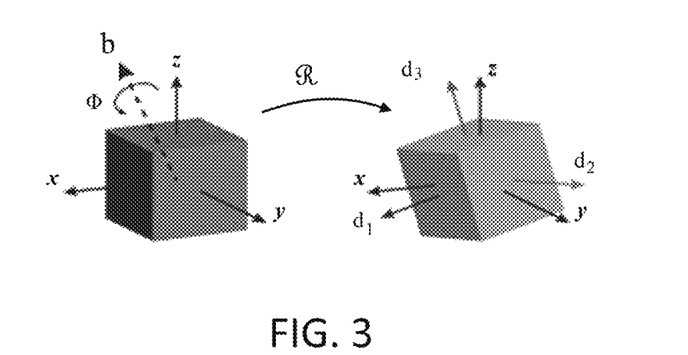
FIG. 3 is schematic diagram depicting a rotation applied to an orientation of a device portion according to an embodiment.

From the above discussion, the constraint of the mechanical hinge means that the hinge axis of the coupled device portions must be the same for the sensors of each portion. When using orientation quaternions, it is convenient to express changes in terms of rotation around a vector. For example, FIG. 3 schematically depicts the change in a body's axes from (x, y, z) to $(d_1, d_2, d_3)$ due to rotation $\angle$ about vector b. This illustration accordingly presents a suitable routine for determining a hinge correction rotation (DQ) that rotates the quaternion for a first device portion (Q1) so that the y-axis of DQ*Q1 matches the y-axis of the quaternion for a second device portion (Q2). In this example, the hinge axis is aligned with the respective y-axes, but as noted above, any sensor orientation may be used so long as the orientation with respect to the hinge axis is known. The hinge correction is a rotation along the Gravity vector, as Q1 and Q2 only drift along the Gravity axis as discussed above. For the purposes of this description, S1 refers to the sensor frame for the first device portion, S2 to the sensor frame for the second device portion and WF to the world frame. As previously discussed, Q1 and Q2 represent the orientations (quaternions) determined using the information from the sensor assemblies for the first and second portions respectively.

Figure 4:
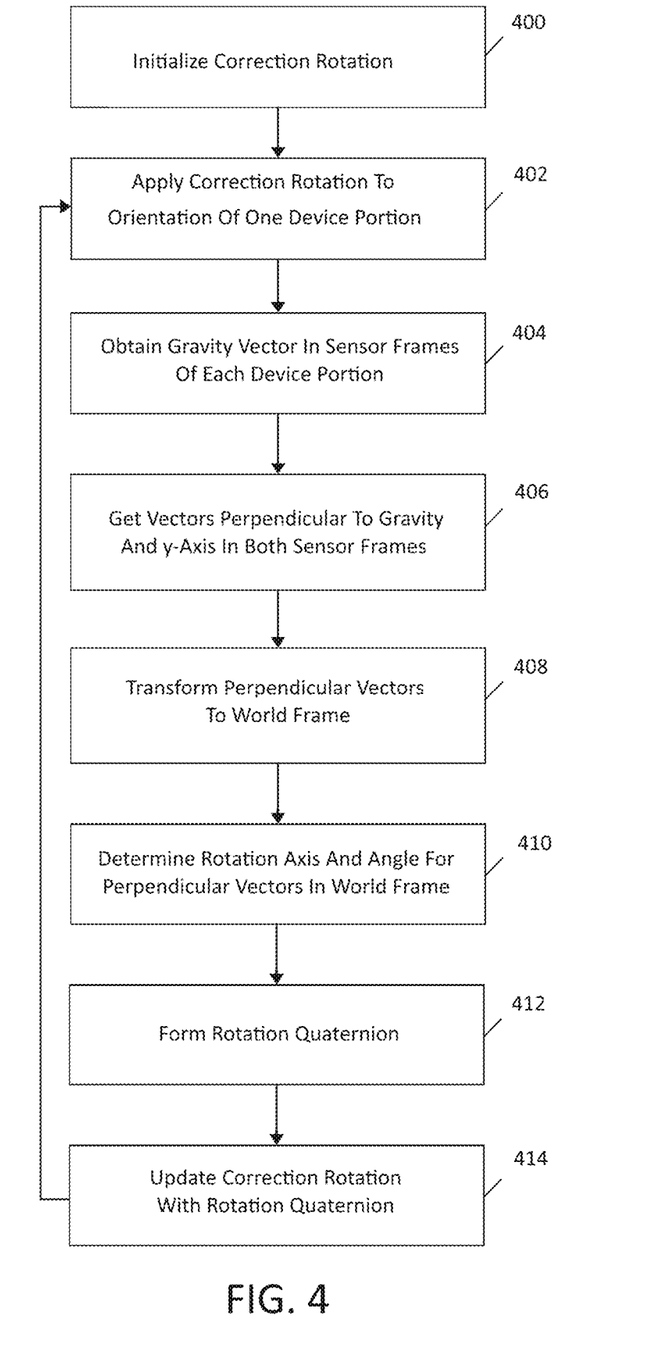
FIG. 4 is a flowchart showing a routine for determining hinge angle constraining an axis of one portion of a device with an axis of another portion of the device according to an embodiment.

A suitable iterative routine for determining DQ is schematically represented in FIG. 4. Beginning with 400, the correction rotation DQ is initialized at a unit value representing an identity operation without rotation. A loop then starts in 402 by applying the DQ rotation to Q1 to obtain a corrected orientation for the first portion, Q1Cor. Although this routine is described in the context of applying a correction to the first portion to align its hinge axis with the hinge axis of the second portion, other alternatives are possible as noted above, such as correcting the second portion to align with the first or correcting both to align with a common intermediate. In 404, the gravity vectors G1 and G2 for the sensor frames S1 and S2 are obtained. The cross product of the y-axis and each of the gravity vectors G1 and G2 is taken to determine the vectors perpendicular to gravity and each y-axis in both sensor frames, Y1Perp and Y2Perp in 406, each of which is then transformed to the world frame using the corrected orientation Q1Cor of the first portion and the orientation Q2 of the second portion in 408, forming Y1PerpWF to Y2PerpWF respectively. Next, the rotation axis and angle needed to match Y1PerpWF to Y2PerpWF and thereby constrain the orientations to have the same hinge axis is determined in 410 by taking the respective cross products and aligning with gravity. A rotation quaternion QW based on the determined axis and angle is formed in 412 so that the correction rotation DQ can be updated with the rotation quaternion QW in 414. As indicated, the routine iterates by returning to 402 to being the operations again with the updated correction rotation DQ.

In a further aspect, constraining the hinge axes of each device portion improves the accuracy of orientation determination for the portions and this can be leveraged to employ additional usage of the motion sensor data. For example, when there is overall motion of the device, even though both sensor assemblies undergo the same acceleration, the different axes experience different components of that motion because they are at different angles. When the motion sensors are well calibrated (e.g., low bias error), angles within the three degrees of freedom may be determined from small vibrations resulting from hand operation for example. Thus, as one illustration in the context of the above disclosure, the hinge angle can be derived from such motion in that the following equations provide a non-limiting illustration of how to employ accelerometer and gyroscope information to determine hinge angle according to the principles noted above.

For the sake of simplicity, these equations only show the gravity component, but one of ordinary skill in the art can incorporate the proper acceleration and take into account the position of the sensors. For accelerometer data, Equation (1) may be applied when $(|(Ax_1, Az_1)|/|Ay_1|) > \tan(\text{AlphaMinForA})$, as may be determined empirically:

$$\begin{bmatrix} Ax_1 \\ Ay_1 \\ Az_1 \end{bmatrix} = \begin{bmatrix} \cos(\text{Hinge}) & 0 & \sin(\text{Hinge}) \\ 0 & 1 & 0 \\ -\sin(\text{Hinge}) & 0 & \cos(\text{Hinge}) \end{bmatrix} \begin{bmatrix} Ax_2 \\ Ay_2 \\ Az_2 \end{bmatrix} \quad (1)$$

As will be appreciated, Equation (1) is valid even when the motion is due to linear acceleration rather than rotation, so the high frequencies should be retained. In other embodiments, thresholds other than $(|(Ax_1, Az_1)|/|Ay_1|)$ may be employed as appropriate for desired signal characteristics, such as signal-to-noise ratio. Further, as an alternative or in addition, other methods like a recursive least square technique may be used continuously by adjusting a signal weight of the estimation based on signal magnitude. However, the acceleration values for the hinge are undetermined when the hinge axis is aligned with gravity and the device is not experiencing linear acceleration for the reasons discussed above. Further, this equation may be refined to accommodate acceleration differences induced by rotation of the device with knowledge of the relative positions of the device portions. This equation may also be employed to confirm hinge axis alignment subject to the constraint discussed above. Likewise, Equation (2) may be applied for gyroscope data when $|(Gx_1, Gz_1)|>DPSMinForG$, also as determined empirically:

$$\begin{bmatrix} Gx_1 \\ Gy_1 \\ Gz_1 \end{bmatrix} = \begin{bmatrix} \cos(\text{Hinge}) & 0 & \sin(\text{Hinge}) \\ 0 & 1 & 0 \\ -\sin(\text{Hinge}) & 0 & \cos(\text{Hinge}) \end{bmatrix} \begin{bmatrix} Gx_2 \\ Gy_2 \\ Gz_z \end{bmatrix} \quad (2)$$

As desired, high frequencies may be retained but the hinge angle cannot be determined from the gyroscope data when no rotation is being applied to the device. According to the discussion above, other suitable thresholds may be employed as well. Further, this equation can also be used to confirm hinge axis alignment subject to the constraint discussed above. Finally, Equation (3) relates the y-axis gyroscope data (which is the hinge angle in this embodiment) to determine variations in hinge angle over time when the difference exceeds a suitable threshold that account for offset:

$$\frac{d(\text{Hinge})}{dt} = Gy_1 - Gy_2 \quad (3)$$

Accordingly, Equations (1) and (2) may be employed together for estimating absolute hinge angle and Equation (3) can be used with the absolute hinge angle to track changes in hinge angle over time.

Although the present invention has been described in accordance with the embodiments shown, one of ordinary skill in the art will readily recognize that there could be variations to the embodiments and those variations would be within the spirit and scope of the present invention. Accordingly, many modifications may be made by one of ordinary skill in the art without departing from the spirit and scope of the present invention.

What is claimed is:

1. A method for determining a relative position of different device portions for a first portion of a device coupled to a second portion of the device by a mechanical hinge with one degree of rotational freedom along a hinge axis, comprising:
   obtaining motion sensor data from a sensor assembly integrated with the first portion of the device, wherein the sensor assembly comprises a three-axis accelerometer and a three-axis gyroscope;
   obtaining motion sensor data from a sensor assembly integrated with the second portion of the device, wherein the sensor assembly comprises a three-axis accelerometer and a three-axis gyroscope;
   performing six-axis sensor fusion for each sensor assembly with the obtained motion sensor data to relate the first portion of the device and the second portion of the device to a world frame;
   determining an angular orientation between the first portion of the device and the second portion of the device with respect to the hinge axis based at least in part to the relation of the first portion of the device and the second portion of the device; and
   compensating for accumulating sensor measurement errors in the determination of angular orientation between the first portion of the device and the second portion of the device by constraining a determined axis of the sensor assembly of the first portion with a determined axis of the sensor assembly of the second portion based at least in part on the obtained motion sensor data and known relationships between physical axes of the sensor assemblies and the mechanical hinge, wherein the determined axis of the sensor assembly of the first portion and the determined axis of the sensor assembly of the second portion are aligned along the hinge axis and wherein the device can assume any orientation including an orientation that substantially aligns the mechanical hinge with a gravity vector.

2. The method of claim 1, further comprising tracking the determined angular orientation over time when compensating for the accumulating sensor measurement errors.

3. The method of claim 2, further comprising determining an absolute orientation for the first portion and an absolute orientation for the second portion during the tracking.

4. The method of claim 1, wherein compensating for the accumulating sensor measurement errors comprises applying a determined rotation angle about the gravity vector to an orientation of at least one of the portions of the device.

5. The method of claim 1, wherein compensating for the accumulating sensor measurement errors comprises determining a relative orientation for the first portion and a relative orientation for the second portion such that the determined axis for sensor assembly of the first portion is set to match the determined axis of the sensor assembly of the second portion.

6. The method of claim 1, further comprising employing a corrected orientation of at least one of the portions of the device to determine hinge angle based on motion of the device.

7. The method of claim 6, further comprising performing a previous calibration of the sensor assembly of the first portion and the sensor assembly of the second portion when the mechanical hinge is not aligned with a gravity vector.

8. A system for determining a relative position of different device portions, comprising:
   a first portion of a device having an integrated sensor assembly configured to output motion sensor data, wherein the sensor assembly comprises a three-axis accelerometer and a three-axis gyroscope;
   a second portion of the device having an integrated sensor assembly configured to output motion sensor data, wherein the sensor assembly comprises a three-axis accelerometer and a three-axis gyroscope;
   a mechanical hinge with one degree of rotational freedom along a hinge axis coupling the first portion of the device and the second portion of the device; and
   at least one processor configured to:

perform six-axis sensor fusion for each sensor assembly with the motion sensor data to relate the first portion of the device and the second portion of the device to a world frame;

determine an angular orientation between the first portion of the device and the second portion of the device with respect to the hinge axis based at least in part to the relation of the first portion of the device and the second portion of the device; and compensate for accumulating sensor measurement errors by constraining a determined axis of the sensor assembly of the first portion with a determined axis of the sensor assembly of the second portion based at least in part on the obtained motion sensor data and known relationships between physical axes of the sensor assemblies and the mechanical hinge, wherein the determined axis of the sensor assembly of the first portion and the determined axis of the sensor assembly of the second portion are aligned along the hinge axis and wherein the device can assume any orientation including an orientation that substantially aligns the mechanical hinge with a gravity vector.

9. The system of claim 8, wherein the at least one processor is further configured to track the determined angular orientation over time when compensating for the accumulating sensor measurement errors.

10. The system of claim 9, wherein the at least one processor is further configured to determine an absolute orientation for the first portion and an absolute orientation for the second portion during the tracking.

11. The system of claim 8, wherein the at least one processor is further configured to compensate for the accumulating sensor measurement errors by applying a determined rotation angle about the gravity vector to an orientation of at least one of the portions of the device.

12. The system of claim 11, wherein the at least one processor is further configured to compensate for the accumulating sensor measurement errors by determining a relative orientation for the first portion and a relative orientation for the second portion such that the hinge axis for the sensor assembly of the first portion is set to match the hinge axis of the sensor assembly of the second portion.

13. The system of claim 8, wherein the at least one processor is further configured to employ a corrected orientation of at least one of the portions of the device to determine hinge angle based on motion of the device.

14. The system of claim 13, wherein the at least one processor is further configured to perform a previous calibration of the sensor assembly of the first portion and the sensor assembly of the second portion when the mechanical hinge is not aligned with a gravity vector.

* * * * *